United States Patent
Merlin et al.

(10) Patent No.: US 10,448,390 B2
(45) Date of Patent: Oct. 15, 2019

(54) TRANSMISSION TECHNIQUES FOR ENABLING AN IMMEDIATE RESPONSE

(71) Applicant: QUALCOMM Incorporated, San Diego, CA (US)

(72) Inventors: Simone Merlin, San Diego, CA (US); Bin Tian, San Diego, CA (US); Youhan Kim, San Jose, CA (US); George Cherian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/973,335

(22) Filed: Dec. 17, 2015

(65) Prior Publication Data
US 2016/0183253 A1    Jun. 23, 2016

Related U.S. Application Data

(60) Provisional application No. 62/094,929, filed on Dec. 19, 2014.

(51) Int. Cl.
*H04W 4/00*  (2018.01)
*H04W 72/04*  (2009.01)
(Continued)

(52) U.S. Cl.
CPC ....... *H04W 72/0446* (2013.01); *H04L 1/0042* (2013.01); *H04L 1/1685* (2013.01);
(Continued)

(58) Field of Classification Search
CPC .............................................. H04W 74/0808
See application file for complete search history.

(56) References Cited

U.S. PATENT DOCUMENTS 5,802,068 A  *  9/1998  Kudo ............... H04J 3/247
                                        370/528
7,239,648 B1 *  7/2007  Feng ............... H04L 1/1692
                                        370/337
(Continued)

FOREIGN PATENT DOCUMENTS

JP    2008271312 A    11/2008
WO    2015191901 A1   12/2015

OTHER PUBLICATIONS

International Search Report and Written Opinion—PCT/US2015/066602—ISA/EPO—Mar. 21, 2016.
(Continued)

*Primary Examiner* — Guang W Li
(74) *Attorney, Agent, or Firm* — Patterson & Sheridan, L.L.P.

(57) ABSTRACT

Certain aspects of the present disclosure provide methods and apparatus for enabling an immediate response. In this manner, issues can be avoided where data carried by the last symbol of a frame cannot be entirely decoded by a receiver within a deadline for generating an immediate response. One example method for wireless communications by a first apparatus generally includes determining at least one constraint for communicating with a second apparatus; generating a frame that solicits a response; and outputting the frame for transmission to the second apparatus, wherein at least a last symbol of the frame is transmitted in a manner determined by the constraint to allow the second apparatus to transmit the response within a determined period.

11 Claims, 8 Drawing Sheets

(51) Int. Cl.
  *H04L 5/00* (2006.01)
  *H04L 1/00* (2006.01)
  *H04L 1/16* (2006.01)
  *H04W 74/08* (2009.01)
  *H04W 84/12* (2009.01)
  *H04W 74/00* (2009.01)

(52) U.S. Cl.
  CPC ....... *H04L 5/0064* (2013.01); *H04W 74/0808* (2013.01); *H04W 74/002* (2013.01); *H04W 84/12* (2013.01)

(56) References Cited

U.S. PATENT DOCUMENTS

| | | | | |
|---|---|---|---|---|
| 7,584,406 | B2* | 9/2009 | Niu | H03M 13/1102 714/790 |
| 8,543,724 | B2* | 9/2013 | Brelay | G11B 27/005 380/201 |
| 8,988,979 | B2* | 3/2015 | Srinivasa | H04L 5/0091 370/206 |
| 9,608,789 | B2* | 3/2017 | Wang | H04L 5/0055 |
| 2006/0007952 | A1* | 1/2006 | Oishi | H04W 28/06 370/465 |
| 2006/0007953 | A1* | 1/2006 | Vesma | H04L 1/0057 370/466 |
| 2006/0036923 | A1* | 2/2006 | Hedberg | H03M 13/1102 714/752 |
| 2007/0143656 | A1* | 6/2007 | Niu | H03M 13/1102 714/752 |
| 2008/0049869 | A1* | 2/2008 | Heinrich | H03M 13/1137 375/298 |
| 2010/0198980 | A1* | 8/2010 | Astrom | H04L 1/0014 709/231 |
| 2011/0134816 | A1* | 6/2011 | Liu | H04L 1/06 370/310 |
| 2011/0249660 | A1* | 10/2011 | Noh | H04L 5/0023 370/338 |
| 2013/0177096 | A1* | 7/2013 | Park | H04B 7/0452 375/267 |
| 2013/0301569 | A1* | 11/2013 | Wang | H04L 5/0055 370/329 |
| 2015/0365263 | A1* | 12/2015 | Zhang | H04L 1/0057 375/295 |
| 2016/0081054 | A1* | 3/2016 | Zhang | H04W 64/00 370/252 |
| 2016/0330726 | A1* | 11/2016 | Li | H04L 5/14 |

OTHER PUBLICATIONS

Zhang H., "HE PHY Padding and Packet Extension; 11-15-0810-01-00ax-he-phy-padding-and-packet-extension," IEEE Draft; 11-15-0810-01-00AX-HE-PHY-PADDING-AND-PACKET-EXTENSION, IEEE-SA Mentor, Piscataway, NJ USA, vol. 802.11ax, No. 1, Sep. 14, 2015 (Sep. 14, 2015), pp. 1-46, XP068098035 [ retrieved on Sep. 14, 2015] slides 12 to 18.

Taiwan Search Report—TW104142767—TIPO—dated Feb. 26, 2019.

* cited by examiner

TRANSMISSION TECHNIQUES FOR ENABLING AN IMMEDIATE RESPONSE

CLAIM OF PRIORITY UNDER 35 U.S.C. § 119

The present application claims benefit of U.S. Provisional Patent Application Ser. No. 62/094,929, entitled "TRANSMISSION TECHNIQUES FOR ENABLING AN IMMEDIATE RESPONSE" and filed Dec. 19, 2014, which is assigned to the assignee of the present application and is hereby expressly incorporated by reference herein in its entirety.

BACKGROUND

Field of the Disclosure

Certain aspects of the present disclosure generally relate to wireless communications and, more particularly, to transmission techniques for enabling an immediate response.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed. Once such scheme allows multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters). Another scheme to achieve greater throughput is HEW (High Efficiency WiFi or High Efficiency WLAN) being developed by the IEEE 802.11ax task force. The goal of this scheme is to achieve a throughput 4× that of IEEE 802.11ac.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include improved communications in a wireless network.

Certain aspects of the present disclosure generally relate to transmission techniques for enabling an immediate response. As used herein, the term "immediate response" generally refers to a response frame that is transmitted in response to a request (frame) within, at the end of, or just after a defined period of time.

Certain aspects of the present disclosure provide a method for wireless communications by a first apparatus. The method generally includes determining at least one constraint for communicating with a second apparatus; generating a frame that solicits a response; and outputting the frame for transmission to the second apparatus, wherein at least a last symbol of the frame is transmitted in a manner determined by the constraint to allow the second apparatus to transmit the response within a determined period.

Certain aspects of the present disclosure provide a first apparatus for wireless communications. The first apparatus generally includes a processing system configured to determine at least one constraint for communicating with a second apparatus; to generate a frame that solicits a response; and to output the frame for transmission to the second apparatus, wherein at least a last symbol of the frame is transmitted in a manner determined by the constraint to allow the second apparatus to transmit the response within a determined period.

Certain aspects of the present disclosure provide a first apparatus for wireless communications. The first apparatus generally includes means for determining at least one constraint for communicating with a second apparatus; means for generating a frame that solicits a response; and means for outputting the frame for transmission to the second apparatus, wherein at least a last symbol of the frame is transmitted in a manner determined by the constraint to allow the second apparatus to transmit the response within a determined period.

Certain aspects of the present disclosure provide a non-transitory computer-readable medium for wireless communications. The medium has instructions stored thereon, which are executable (by an apparatus, such as a computer processor) to determine, at a first apparatus, at least one constraint for communicating with a second apparatus; to generate a frame that solicits a response; and to output the frame for transmission to the second apparatus, wherein at least a last symbol of the frame is transmitted in a manner determined by the constraint to allow the second apparatus to transmit the response within a determined period.

Certain aspects of the present disclosure provide a wireless node. The wireless node generally includes a processing system, a transmitter, and at least one antenna. The processing system is configured to determine at least one constraint for communicating with an apparatus and to generate a frame that solicits a response. The transmitter is configured to transmit the frame to the apparatus via the at least one antenna, wherein at least a last symbol of the frame is transmitted in a manner determined by the constraint to allow the apparatus to transmit the response within a determined period.

Certain aspects of the present disclosure provide a method for wireless communications by a first apparatus. The method generally includes generating a frame that solicits a response within a determined period, the frame comprising a first portion having one or more symbols (e.g., orthogonal frequency division multiplexing (OFDM) symbols) and a second portion positioned after the first portion and having a plurality of symbols; setting a data rate for the one or more symbols in the first portion to be greater (e.g., at least four times greater) than a data rate for the plurality of symbols in the second portion; and outputting the frame for transmission to a second apparatus.

Certain aspects of the present disclosure provide a first apparatus for wireless communications. The first apparatus generally includes a processing system configured to generate a frame that solicits a response within a determined period, the frame comprising a first portion having one or more symbols and a second portion positioned after the first portion in the frame and having a plurality of symbols; to set a data rate for the one or more symbols in the first portion to be greater than a data rate for the plurality of symbols in the second portion; and to output the frame for transmission to a second apparatus.

Certain aspects of the present disclosure provide a first apparatus for wireless communications. The first apparatus generally includes means for generating a frame that solicits a response within a determined period, the frame comprising a first portion having one or more symbols and a second portion positioned after the first portion in the frame and having a plurality of symbols; means for setting a data rate for the one or more symbols in the first portion to be greater than a data rate for the plurality of symbols in the second portion; and means for outputting the frame for transmission to a second apparatus.

Certain aspects of the present disclosure provide a non-transitory computer-readable medium for wireless communications. The medium has instructions stored thereon, which are executable (by an apparatus, such as a computer processor) to generate, at a first apparatus, a frame that solicits a response within a determined period, the frame comprising a first portion having one or more symbols and a second portion positioned after the first portion in the frame and having a plurality of symbols; to set a data rate for the one or more symbols in the first portion to be greater than a data rate for the plurality of symbols in the second portion; and to output the frame for transmission to a second apparatus.

Certain aspects of the present disclosure provide a wireless node. The wireless node generally includes a processing system, a transmitter, and at least one antenna. The processing system is typically configured to generate a frame that solicits a response within a determined period, the frame comprising a first portion having one or more symbols and a second portion positioned after the first portion in the frame and having a plurality of symbols; and to set a data rate for the one or more symbols in the first portion to be greater than a data rate for the plurality of symbols in the second portion. The transmitter is typically configured to transmit the frame to an apparatus via the at least one antenna.

Certain aspects of the present disclosure provide a method for wireless communications by a first apparatus. The method generally includes generating a frame that solicits a response within a determined period, the frame comprising a plurality of symbols, wherein the generating comprises placing information necessary for a second apparatus to generate the response in a symbol of the frame that precedes a last symbol of the frame and preventing the information necessary for the second apparatus to generate the response from being included in the last symbol of the frame; and outputting the frame for transmission to the second apparatus.

Certain aspects of the present disclosure provide a first apparatus for wireless communications. The first apparatus generally includes a processing system configured to generate a frame that solicits a response within a determined period, the frame comprising a plurality of symbols, wherein the processing system is configured to generate the frame by placing information necessary for a second apparatus to generate the response in a symbol of the frame that precedes a last symbol of the frame and by preventing the information necessary for the second apparatus to generate the response from being included in the last symbol of the frame; and to output the frame for transmission to the second apparatus.

Certain aspects of the present disclosure provide a first apparatus for wireless communications. The first apparatus generally includes means for generating a frame that solicits a response within a determined period, the frame comprising a plurality of symbols, wherein the means for generating is configured to generate the frame by placing information necessary for a second apparatus to generate the response in a symbol of the frame that precedes a last symbol of the frame and by preventing the information necessary for the second apparatus to generate the response from being included in the last symbol of the frame; and means for outputting the frame for transmission to the second apparatus.

Certain aspects of the present disclosure provide a non-transitory computer-readable medium for wireless communications. The medium has instructions stored thereon, which are executable (by an apparatus, such as a processing system) to generate, at a first apparatus, a frame that solicits a response within a determined period, the frame comprising a plurality of symbols, wherein the generating comprises placing information necessary for a second apparatus to generate the response in a symbol of the frame that precedes a last symbol of the frame and preventing the information necessary for the second apparatus to generate the response from being included in the last symbol of the frame; and to output the frame for transmission to the second apparatus.

Certain aspects of the present disclosure provide a wireless node. The wireless node generally includes a processing system, a receiver, and at least one antenna. The processing system is typically configured to generate a frame that solicits a response within a determined period, the frame comprising a plurality of symbols, wherein the processing system is configured to generate the frame by placing information necessary for an apparatus to generate the response in a symbol of the frame that precedes a last symbol of the frame and by preventing the information necessary for the apparatus to generate the response from being included in the last symbol of the frame. The transmitter is typically configured to transmit the frame to the apparatus via the at least one antenna.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized in other aspects without specific recitation.

DETAILED DESCRIPTION

Figure 1:
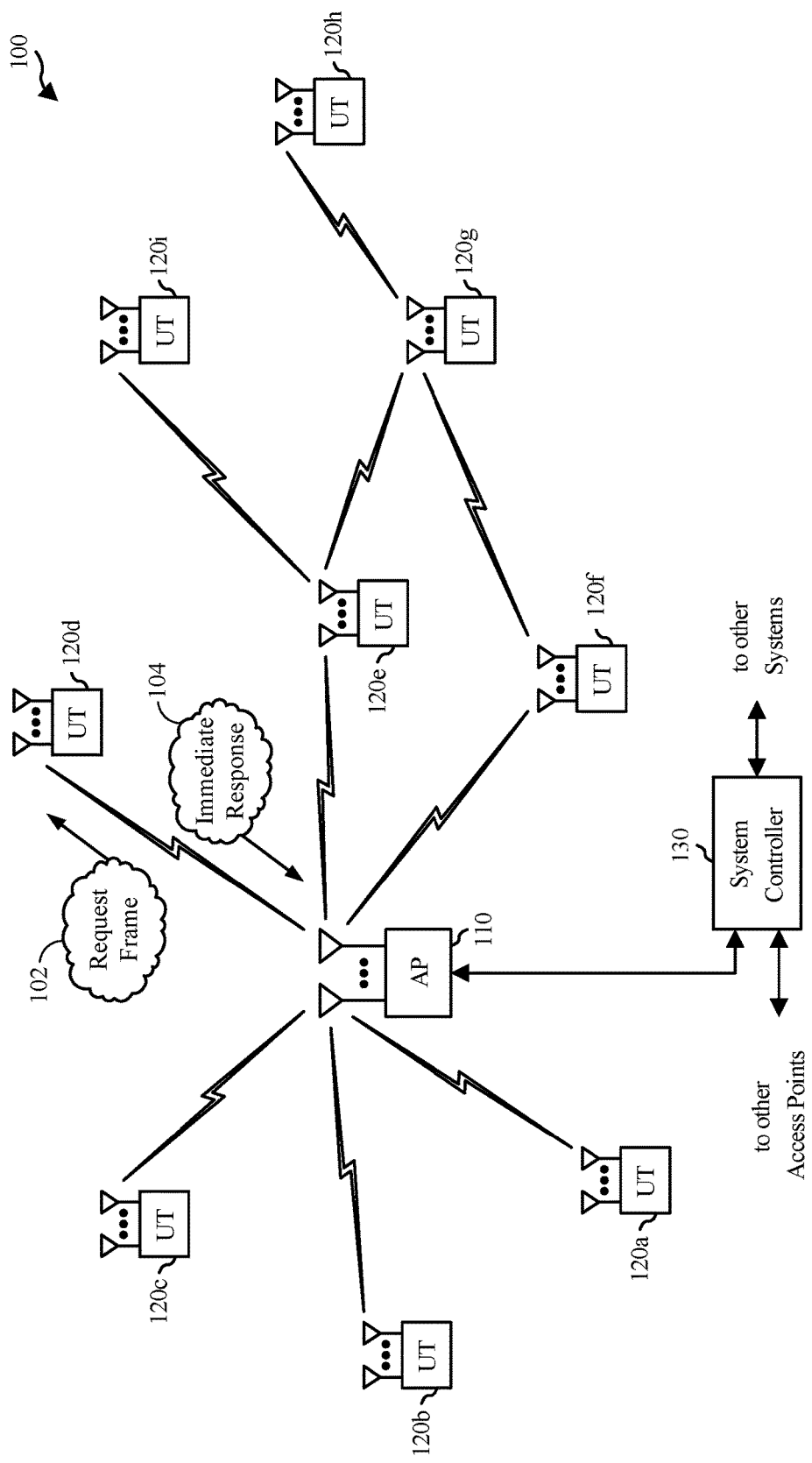
FIG. 1 illustrates an example wireless communications network, in accordance with certain aspects of the present disclosure.

Certain aspects of the present disclosure provide transmission techniques and apparatus for enabling an immediate response. In this manner, issues can be avoided where data carried by the last symbol of a frame cannot be entirely decoded by a receiver within a deadline for generating an immediate response.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to a different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communication System

FIG. 1 illustrates a wireless communications system 100 in which aspects of the disclosure may be performed. For example, an access point 110 may send a user terminal 120 a request frame 102 (e.g., a physical layer convergence protocol (PLCP) protocol data unit (PPDU)) having an indication in a physical layer (PHY) header of the request frame that includes an indication that an immediate response is to be sent. A recipient user terminal 120 may determine, based on the indication, that a response is to be sent and may begin generating and transmitting at least a portion of an immediate response 104, for example, before decoding the media access control (MAC) payload of the request frame 102.

The system 100 may be, for example, a multiple-access multiple-input multiple-output (MIMO) system with access points 110 and user terminals 120. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA techniques, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. The system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to a different user terminal 120.

Figure 2:
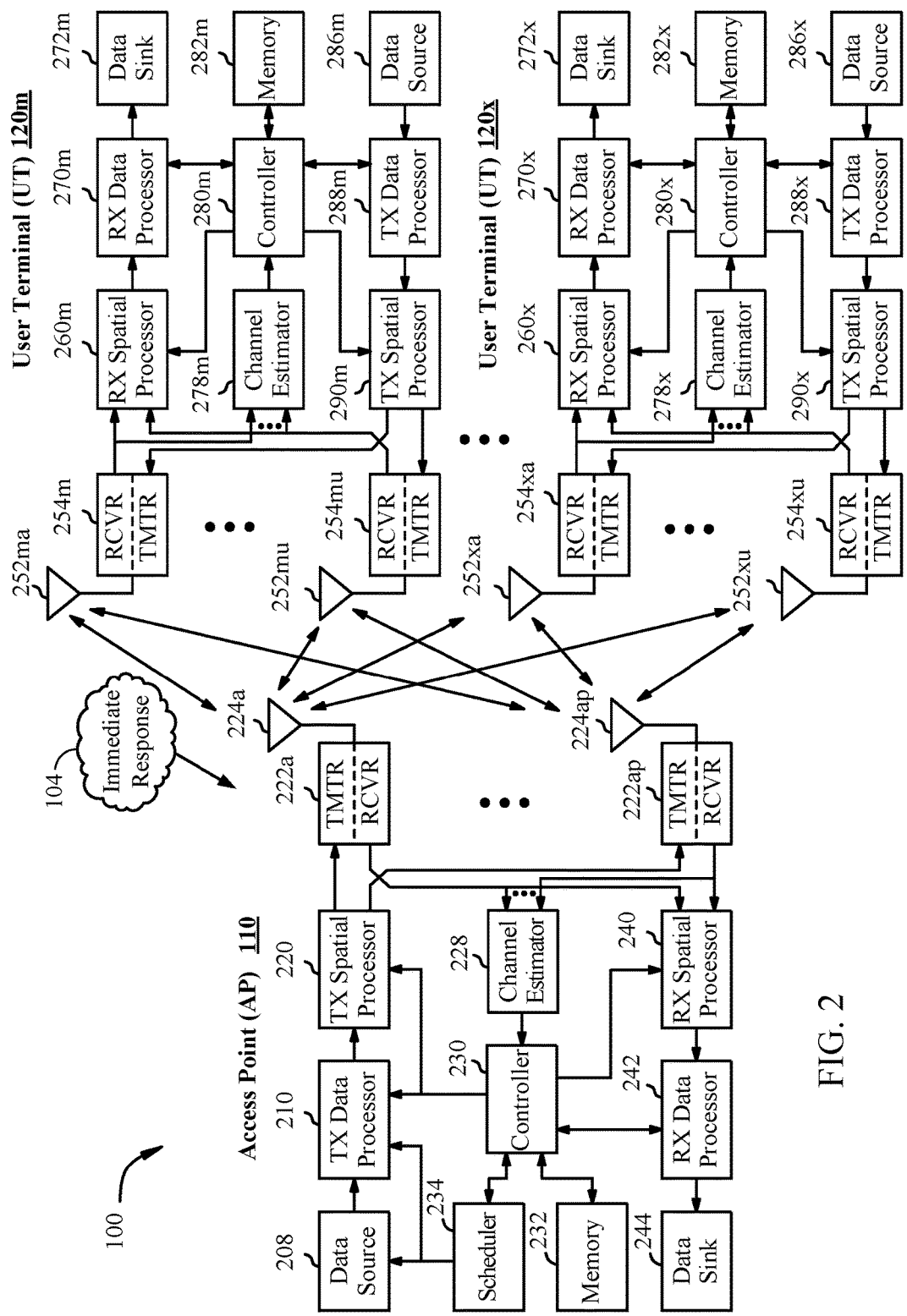
FIG. 2 is a block diagram of an example access point (AP) and user terminals, in accordance with certain aspects of the present disclosure.

FIG. 2 illustrates a block diagram of a system 100 in which aspects of the present disclosure may be performed. For example, the access point 110 may send a user terminal 120 a request frame 102 (e.g., a PPDU) having an indication in a PHY header of the request frame that an immediate response is to be sent. A recipient user terminal 120 may determine, based on the indication, that a response is to be sent and may begin generating and transmitting at least a portion of an immediate response 104, for example, before decoding the MAC payload of the request frame 102.

The system 100 may be, for example, a MIMO system with access point 110 and two user terminals 120m and 120x. The access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device (e.g., an AP or STA) capable of transmitting data via a wireless channel, and a "receiving entity" is an independently operated apparatus or device (e.g., an AP or STA) capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval.

Beam-steering or some other spatial processing technique may be used at the access point and/or user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110. Memory 282 may store data and program codes for the user terminal 120 and may interface with the controller 280.

$N_{up}$ user terminals 120 may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals. Memory 232 may store data and program codes for the access point 110 and may interface with the controller 230.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with CCMI, MMSE or some other technique. An RX data processor 270 processes (e.g., demodulates, deinterleaves and decodes) the recovered downlink data symbol stream to obtain decoded data for the user terminal. The decoded data for each user terminal may be provided to a data sink 272 for storage and/or the controller 280 for further processing.

At each user terminal 120, a channel estimator 278 estimates the downlink channel response and provides downlink channel estimates, which may include channel gain estimates, SNR estimates, noise variance, and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
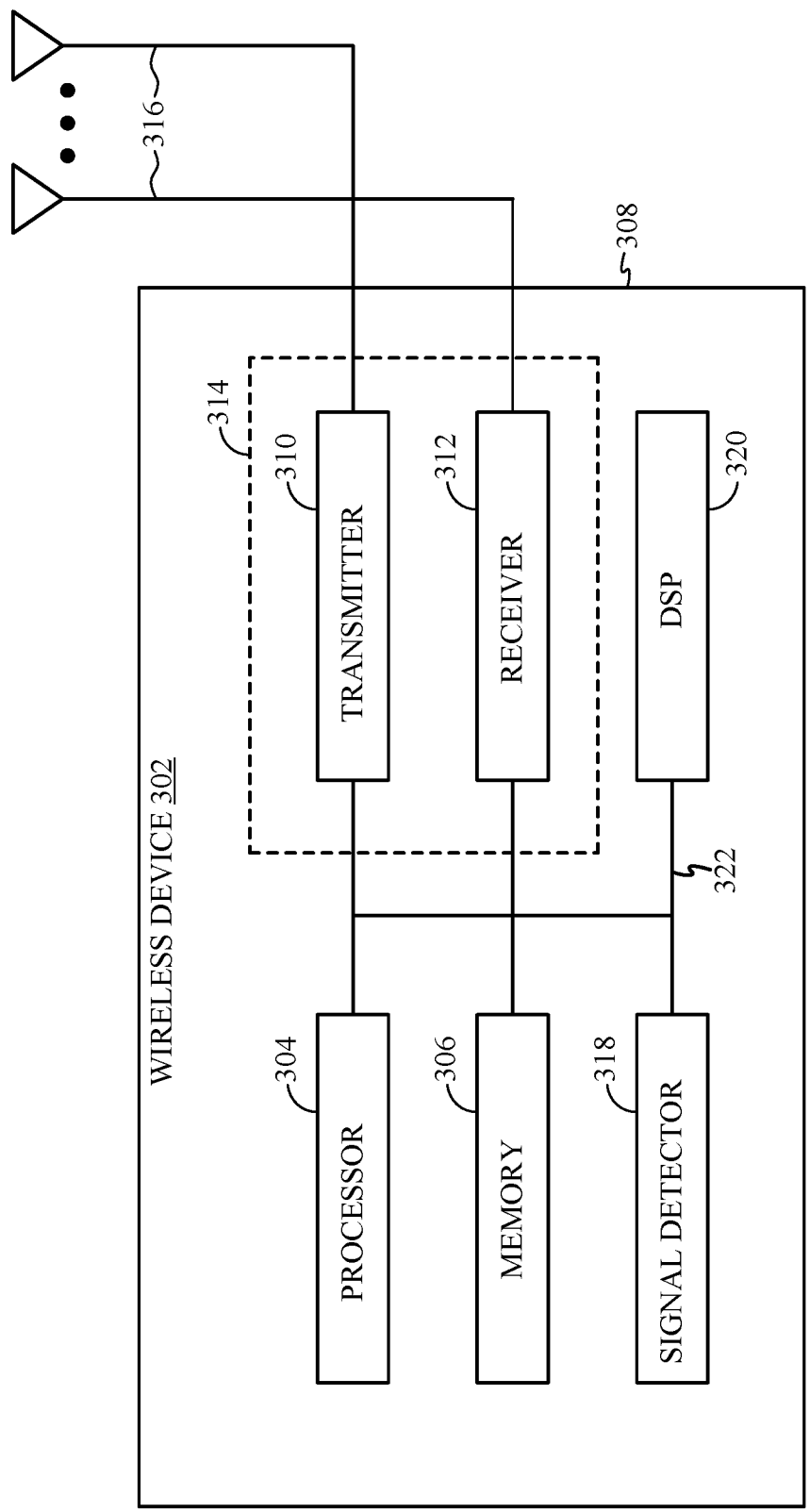
FIG. 3 is a block diagram of an example wireless device, in accordance with certain aspects of the present disclosure.

FIG. 3 illustrates various components that may be utilized in a wireless device 302 that may be employed within the system 100. The wireless device 302 is an example of a device that may be configured to implement the various methods described herein. For example, the wireless device may implement operations 800, 900, or 1000 illustrated in FIGS. 8, 9, and 10, respectively. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and/or multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Techniques for Enabling an Immediate Response

In certain wireless communications systems, such as IEEE 802.11ax (also known as high efficiency wireless (HEW) or high efficiency wireless local area network (WLAN)), physical (PHY) layer and medium access control (MAC) layer signaling may be used for immediate response (e.g., for the request and the response). As used herein, an immediate response may refer to a response frame that is transmitted in response to a request frame within, at the end of, or just after a defined period of time (e.g., after a short interframe space (SIFS)).

Certain MAC frames may solicit an immediate response. For example, a data frame may solicit an acknowledgment (ACK) as an immediate response, a request-to-send (RTS) frame may solicit a clear-to-send (CTS) frame as an immediate response, etc. A request frame (e.g., physical layer convergence protocol (PLCP) protocol data unit (PPDU)) may have a PHY header and a MAC payload (e.g., a MAC protocol data unit (MPDU)). A request PPDU may solicit an immediate response. A response PPDU having a PHY header and an MPDU may be sent in response to the request PPDU after a SIFS.

Signaling that solicits an immediate response is designed to be decoded and processed within "a few μs deadline" after the end of the PPDU, in order to allow time for the response generation. However, it takes a finite amount of time to process the data carried in an orthogonal frequency-division multiplexed (OFDM) symbol (e.g., to perform fast Fourier transform (FFT), decoding, etc.). If all the data carried by the PPDU, including the last OFDM symbol, is decoded within the deadline, then there is no issue. For instance, this may be the case for frames sent according to the current IEEE 802.11 standard, also referred to herein as "1× frames" (as opposed to frames (referred to herein as "4× frames") sent according to IEEE 802.11ax, which uses an FFT 4 times larger than a 1×FFT). If the data carried by the last OFDM symbol cannot be entirely decoded within the deadline, then there may (or may not) be an issue with the immediate response. This may be the case for 4× frames, which may involve a longer FFT and more data per symbol compared to 1× frames. Depending on the STA receive (Rx) capabilities and the structure of the signaling, a partial decoding of the bytes in the last symbol may be sufficient for the generation of the response in some cases. For cases where the partial decoding of the last OFDM symbol's data is an issue, then padding may be utilized (i.e., to make the "last" OFDM symbol not actually be the last). Another option may be to avoid requesting an immediate response.

For responding to 4× frames, particular solutions may be based on one or more assumptions. One main assumption is that the MAC information necessary and sufficient for starting the transmission of the immediate response spills into the last OFDM symbol. Then, whether the immediate response is an issue or not may depend on which of the following assumptions is correct and on the feasibility of certain aspects of the present disclosure.

For certain aspects, it may be assumed that either all or none of the last OFDM symbol's bytes are decoded (referred to hereinafter as "Assumption 1.0"). In other words, if it takes longer than the immediate response period (i.e., by the deadline) to demodulate and process the last OFDM symbol's bytes, all these bytes are lost (and a response cannot be generated).

For other aspects, it may be assumed that a receiver can demodulate and process up to X physical layer (PHY) bytes in the last OFDM symbol within the immediate response period, even though the last OFDM symbol may carry more than x bytes. In some cases (referred to hereinafter as "Assumption 1.1"), bytes processed before the deadline may be kept, but those processed after the deadline are lost. In other cases (referred to hereinafter as "Assumption 1.2"), bytes after the deadline can be received and processed while the response is being created and sent (e.g., while a Short Training field (STF) and a Long Training field (LTF) are already being sent, assuming all the information for the response is within the first X bytes).

Certain aspects of the present disclosure provide transmission techniques for enabling an immediate response from a receiver, which may avoid appending padding to a frame that solicits the response.

For certain aspects (suited for Assumptions 1.0 or 1.1), the transmitter may not be allowed to send (4×) frames expecting an immediate response at a rate higher than R. R may be specified by the IEEE 802.11ax amendment (or subsequent amendments) to the IEEE 802.11 standard or may be indicated by the receiver to the transmitter. The rate limit (R) may be expressed in terms of PHY rate or a combination of modulation and coding scheme (MCS), bandwidth (BW), coding, and number of spatial streams ($N_{SS}$) (e.g., for all 20 MHz transmissions, there may be no issue). For other aspects, the transmitter may be allowed to send PPDUs that exceed the rate limit, in which case the transmitter may use padding to lengthen the PPDU and avoid the immediate response issue.

For other aspects, the transmitter may not be permitted to send frames expecting immediate response with the last (or N last) OFDM symbol(s) sent at a rate higher than R. As described above, R may be specified by the IEEE 802.11ax amendment (or subsequent amendments) to the IEEE 802.11 standard or may be indicated by the receiver to the transmitter. The rate limit (R) may be a predetermined threshold expressed in terms of PHY rate or a combination of MCS, BW, coding, and $N_{SS}$. For certain aspects, the MCS of the last symbol may be set to: (1) equal the MCS of the data portion, if the MCS of the data portion is <R; or (2) equal R, if the MCS of the data portion is >R. This scheme involves a PHY design that allows for different MCSs in the data portion. The presence of a different MCS for the last symbol(s) may be indicated, for example, in the PHY header of the transmitted frame. For other aspects, the transmitter may be allowed to send frames expecting immediate response with the last OFDM symbol sent at a rate higher than R, in which case the transmitter may use padding to lengthen the PPDU and avoid the immediate response issue.

According to certain aspects (suited for Assumption 1.1), the transmitter may send more than X PHY bytes (e.g., exceeding R) in the last OFDM symbol, but only up to X useful MAC bytes (the remaining bytes would be lost anyway according to the assumption). The limit X may be specified by the IEEE 802.11ax amendment (or subsequent amendments) to the IEEE 802.11 standard or may be indicated by the receiver to the transmitter. The limit X may be a predetermined threshold expressed as a number of bytes, or in terms of PHY rate or a combination of MCS, BW, coding, and $N_{SS}$. If more than X useful MAC bytes are sent, padding may be added to lengthen the PPDU and avoid the immediate response issue.

According to certain aspects, minimum MAC protocol data unit (MPDU) start spacing may be utilized, and may be applied to the last symbol(s) only. The minimum MPDU start spacing determines the minimum time between the start of adjacent MPDUs within an aggregated MPDU (A-MPDU) that the STA can receive. This spacing is already defined today, but currently applies to the entire PPDU. For certain aspects of the present disclosure, a different value may be defined for the last symbol only; single MPDUs are likely decodable anyway.

According to certain aspects, (suited for Assumption 1.2), the transmitter may send more than X PHY bytes (>R) in the last OFDM symbol and more than X MAC bytes, but all the signaling necessary and sufficient for an immediate response is included within the first X bytes (or earlier OFDM symbols in the frame). If this condition above is not fulfilled, padding may be added to lengthen the PPDU and avoid the immediate response issue. The limit X may be specified by the IEEE 802.11ax amendment (or subsequent amendments) to the IEEE 802.11 standard or may be indicated by the receiver to the transmitter. The limit X may be expressed in terms of PHY rate or a combination of MCS, BW, coding, and $N_{ss}$. The condition for this case may only guarantee that the receiver knows to send a response (and likely the type of response). However, the first X bytes may not be sufficient to determine all of what the response should contain. For example, not all data may be decoded, and hence, the block acknowledgment (BA) bitmap may be populated later. As another example, the frame check sequence (FCS) may not be decoded yet, and hence, the acknowledgement (ACK) procedure may be modified.

According to certain aspects, (suited for Assumption 1.2), the transmitter may send the last N OFDM symbols as 1×OFDM symbols instead of 4×OFDM symbols. The transmitter may do that if the rate is >R. The transmitter may not be allowed to send PPDUs that expect an immediate response with a 4× last (or N last) OFDM symbol(s) and a rate >R. The rate limit (R) may be expressed in terms of PHY rate or a combination of MCS, BW, coding, and $N_{SS}$. For other aspects, the transmitter may be allowed to send frames that do not meet the above condition, in which case the transmitter may use padding to lengthen the PPDU and avoid the immediate response issue.

If the information necessary and sufficient to start the immediate response is not in the last OFDM symbol of a 4× frame, then the immediate response is not an issue. This is assuming the MAC can start processing the data as soon as it becomes available. Depending on the assumptions described above, the last OFDM symbol may be decoded or dropped. The decoding of the last OFDM symbol may not be necessary for identifying the immediate response, but it may be useful for determining the content of the immediate response (e.g., for trigger or Block Ack) and to increase the efficiency (decode all the data MPDUs). Given this discussion, the transmitter may not include any information necessary for immediate response in the last OFDM symbol, in accordance with certain aspects of the present disclosure.

When the conditions in the various scenarios described above are verified, padding can be avoided; otherwise, padding may be added. In other words, padding may be added in an adaptive way (e.g., if the transmitter rules are broken or exceeded). For example, padding may be added if a frame solicits an immediate response and if one of the following conditions are met: (1) the frame is sent at rate >R, or if the last symbol of the frame is sent at a rate >R; (2) if there are more than X bytes in the last symbol, or if there is less than a minimum MPDU spacing in the last symbol; (3) if the architecture is not able to process a partial OFDM symbol for response; or (4) if the MAC information for immediate response is not confined within X bytes. The receiving entity (e.g., a STA), or an IEEE 802.11 standard amendment, may indicate the conditions/parameters for which padding is invoked. For example, a STA may indicate whether padding is called for and when (the maximum rate R or the maximum number of bytes X, or the minimum MPDU spacing). Alternatively, rate and/or bytes limits may be hardcoded in the IEEE 802.11 standard or amendments thereto.

The transmitting entity decides how to perform its transmission, keeping in mind the constraints and adding padding when justified. For example, the transmitter may use rate <R when requesting an immediate response, in an effort to avoid padding. The transmitter may aggregate packets and ensure the ones expecting an immediate response are in relatively early positions. For other aspects, the transmitter may avoid requesting immediate response and use a delayed Block Ack instead. Despite these alternatives, the transmitter may use padding in some instances.

In order to notify the transmitter, the receiver may signal its limitations with any of various suitable indications. These indications may be carried in a capability indication or an add Block Acknowledgment (ADDBA) indication (with the understanding that certain limitations may only apply to the case of A-MPDUs). For example, the indications may include the maximum number of bytes that can be processed in the last symbol, the max PHY rate allowed for PPDUs requesting the immediate response, or the max PHY rate allowed for the last symbol of a PPDU requesting an immediate response. For certain aspects, the indication may include the minimum MPDU start spacing, which may be applied to the last symbol only. The minimum MPDU spacing determines the minimum time between the start of adjacent MPDUs within an A-MPDU that the STA can receive.

Figure 4:
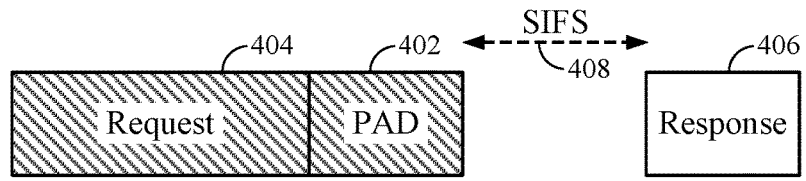
FIG. 4 illustrates padding added to a frame, in accordance with certain aspects of the present disclosure.

As described above, padding may be added to lengthen a frame. FIG. 4 illustrates adding padding 402 to a request frame 404 (e.g., request frame 102), in accordance with certain aspects of the present disclosure. In order to pad the request frame 404, OFDM symbols (e.g., that contain junk padding or useful data that does not expect immediate response) may be appended to the portion of the frame soliciting the response 406 (e.g., immediate response 104). Padding the request frame 404 in this manner preserves the SIFS time 408 as shown. Padding may be done by the PHY layer or by the MAC layer, as described below.

For MAC padding, it may be assumed that IEEE 802.11ax uses A-MPDU for all PPDUs (same as in IEEE 802.11ac). In this case, further MPDUs or delimiters may be added after the last MPDU that expects the immediate response, so that the PPDU length is increased. A suitable number of delimiters and/or MPDUs may be added so that sufficient pad time is generated. In the case of delimiters, end of frame (EoF) delimiters may be added. An EoF delimiter is a regular delimiter with an indication that no more MPDUs will be sent thereafter. In the case of MPDUs, any MPDU not expecting an immediate response may be added. It may be useful to also add an indication that allows the receiver to know whether there are still MPDUs expecting immediate response in the remaining part of the A-MPDU (e.g., use EoF=1 in the delimiter for all MPDUs after the last one expecting immediate response).

Figure 5:
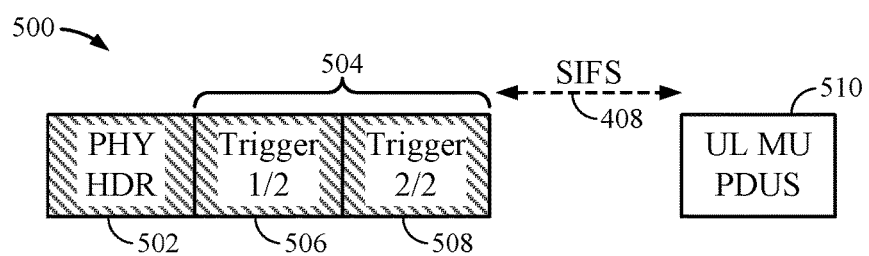
FIG. 5 illustrates a frame having divided trigger portions, in accordance with certain aspects of the present disclosure.

In one example illustrated in FIG. 5, the request PPDU 500 carries a multi-user (MU) trigger frame 504. The MU trigger frame 504 solicits the immediate response from one or more STAs and includes parameters that are used by the receiver to determine the type and content of the response. This allows operation with UL MU-MIMO or UL OFDMA techniques. The MU trigger frame 504 may be split into two parts, such as two MPDUs 506, 508 or two parts within the same MPDU. In this case, a SIFS response 510 (i.e., a response sent after or by the end of a SIFS time 408) may be generated in some implementations based on only the information in the first MPDU 506 (i.e., the immediate response may be formulated without the information in the second MPDU 508), and the later information may be useful for determining the content of the response and may be processed later.

Figure 6:
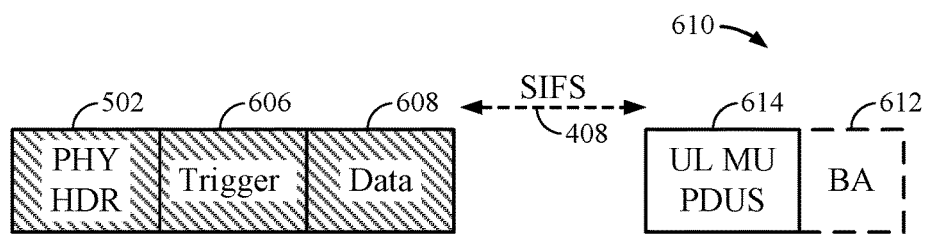
FIG. 6 illustrates a frame having a trigger portion followed by a data portion, in accordance with certain aspects of the present disclosure.

In another example illustrated in FIG. 6, the transmitting entity may send an MU trigger frame 606 followed by a data MPDU 608 with a delayed block acknowledgement (Block Ack) policy. In some implementations, the immediate response 610 may be generated based on only the MU trigger frame 606. For certain aspects, the block acknowledgements (BAs) 612 may be added in a later portion of the UL PPDUs 614.

For PHY padding, one or more OFDM symbols may be added at the end of a frame. In the case of 1× symbols, this padding may include junk or useful information (and being a 1× symbol, this information may even be processed in a SIFS time). In the case of 4× symbols, this padding may include junk symbols, or some useful signaling that does not solicit a SIFS response or that can be processed in a SIFS time. Such useful signaling may include, for example, carrier frequency offset (CFO) correction, channel estimation, and the like.

In contrast with padding, the last 4× symbol (or the last N 4× symbols) of a frame soliciting an immediate response may instead be "converted" to multiple 1× symbols. For example, the last symbol(s) in a 4× frame may use a 1× transmission mode. This is not padding per se because the transmitting entity is not adding new or junk bytes. The presence and/or number of 1× symbols may be indicated in the header and may be negotiated with the receiving entity.

If PHY padding is used, it may be useful to have an indication of the presence and/or duration in the PHY header. Even if the presence is already negotiated between the transmitter and the intended receiver (and depending on how the padding is done), third party STAs may want to know whether there is padding or not (e.g., for broadcast packets).

Alternatively, padding may be used at the receiving entity. In this case, assuming the receiver can be identified on time, but the type and/or content of the response cannot be created on time, the STA may pre-pad its response to gain further time for the MAC processing.

As another alternative solution, the time for an immediate response may be increased to a longer time (e.g., greater than a SIFS time of 10 μs). For example, the time for an immediate response may be increased up to a point coordination function (PCF) interframe space (PIFS). In this case, however, a STA or an AP may grab the medium before the response is sent. A network allocation vector (NAV) or legacy signal field (L-SIG) transmission opportunity (TXOP) may provide protection, but may be unreliable. One ancillary benefit of using PIFS is that this would allow performing a clear channel assessment (CCA) before the response. For certain aspects, the immediate response transmission or the parameters used for the transmission may be a function of the determined CCA conditions.

Figure 7:
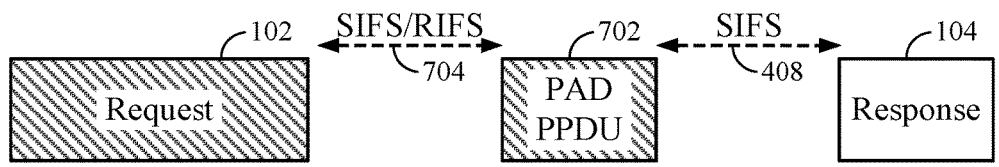
FIG. 7 illustrates an example pad physical layer convergence protocol (PLCP) protocol data unit (PPDU), in accordance with certain aspects of the present disclosure.

Additionally or alternatively for certain aspects, a separate "pad PPDU" 702 that does not expect immediate processing may be sent after the request frame 102, as illustrated in FIG. 7. This pad PPDU 702 may be sent, for example, a SIFS or a reduced interframe space (RIFS) time 704 after transmitting the request frame 102. For certain aspects, the pad PPDU 702 uses a 1× format and can be processed in a SIFS time 408. For example, the pad PPDU 702 may be implemented with a 1× block acknowledgment request (BAR) or a 1× portion of a trigger.

For certain aspects, it may be possible to avoid SIFS responses. However, such response periods may be unavoidable for certain control frames (e.g., RTS, trigger, and BAR/BA). These control frames may be sent using a 1× mode, but would then not enjoy HEW benefits. Another way to avoid SIFS responses is to use a delayed Block Ack policy, where instead of an immediate response, the Block Ack is sent by the receiver at a later time. Currently, however, delayed Block Ack is not widely used as it implies a less predictable management of the Block Ack window. Scheduling the Block Ack may help.

Figure 8:
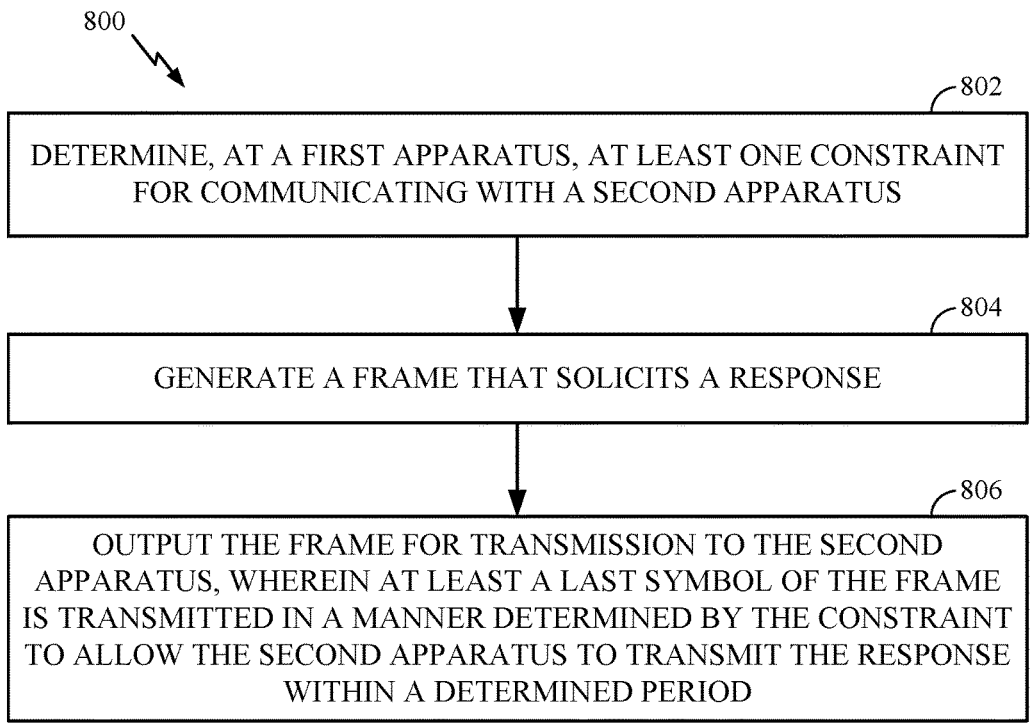
FIG. 8 is a flow diagram of example operations for outputting for transmission a frame that solicits a response, based on a constraint, in accordance with certain aspects of the present disclosure.

FIG. 8 is a flow diagram of example operations 800 for outputting for transmission a frame that solicits a response, based on a constraint, in accordance with certain aspects of the present disclosure. The operations 800 may be performed by, for example, a first apparatus (e.g., an access point 110, a user terminal 120, or a wireless device 302, or a processing system therein).

The operations 800 may begin, at block 802, with the first apparatus determining at least one constraint for communicating with a second apparatus (e.g., an access point 110, a user terminal 120, or a wireless device 302, or a processing system therein). At block 804, the first apparatus generates a frame that solicits a response. At block 806, the first apparatus outputs the frame for transmission to the second apparatus. At least a last symbol of the frame is transmitted in a manner determined by the constraint to allow the second apparatus to transmit the response within a determined period (e.g., a short interframe space (SIFS)).

According to certain aspects, determining the constraint at block 802 involves the first apparatus receiving an indication of the constraint from the second apparatus.

According to certain aspects, the constraint comprises a rate limit. In this case, the frame may be transmitted at a rate less than or equal to the rate limit. The rate limit may be expressed as: (1) a physical layer (PHY) rate; or (2) a modulation and coding scheme (MCS), a bandwidth, a coding rate, a number of spatial streams, or a combination thereof. For certain aspects, generating the frame at block 804 includes using padding in the at least the last symbol if the frame is transmitted at a rate greater than the rate limit. In this case, generating the frame at block 804 may also include indicating, in a header of the frame, at least one of a presence or a duration of the padding in the at least the last symbol. For certain aspects, the at least the last symbol of the frame is transmitted at a rate less than or equal to the rate limit. In this case, a modulation and coding scheme (MCS) of the at least the last symbol may be set equal to: (1) an MCS of a data portion of the frame, if the MCS of the data portion corresponds to a data rate that is less than the rate limit; or (2) an MCS corresponding to the rate limit, if the MCS of the data portion corresponds to a data rate that is greater than or equal to the rate limit. For certain aspects, the rate limit is based on a number of bytes the second apparatus can demodulate and process within the determined period. In this case, the at least the last symbol of the frame is transmitted at a rate greater than the rate limit and wherein: (1) a number of bytes necessary for the second apparatus to generate the response in the last symbol is less than or equal to the number of bytes the second apparatus can demodulate and process within the determined period; or (2) information necessary for the second apparatus to generate the response is limited to an early portion of the last symbol having a number of bytes less than or equal to the number of bytes the second apparatus can demodulate and process within the determined period.

According to certain aspects, generating the frame at block 804 involves generating a 4× frame in accordance with the IEEE 802.11ax amendment or a subsequent amendment to the IEEE 802.11 standard.

Figure 9:
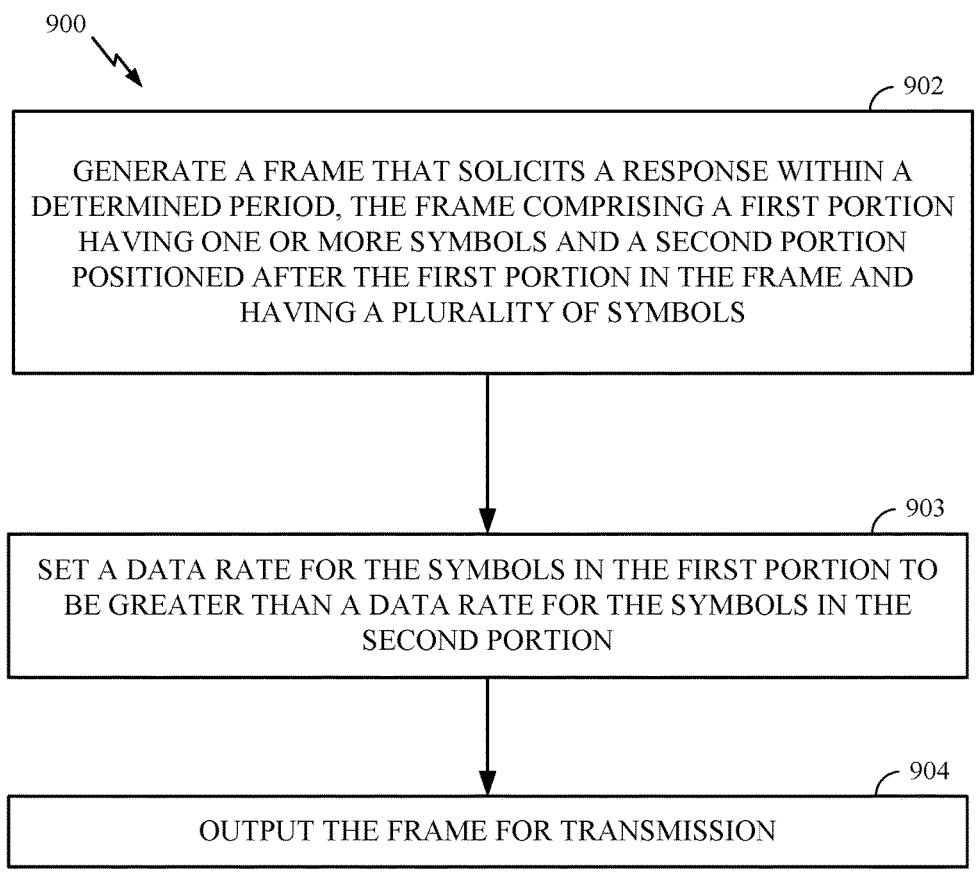
FIG. 9 is a flow diagram of example operations for outputting for transmission a frame that solicits a response and has at least two portions with different data rates, in accordance with certain aspects of the present disclosure.

FIG. 9 is a flow diagram of example operations 900 for outputting for transmission a frame that solicits a response and has at least two portions with different data rates, in accordance with certain aspects of the present disclosure. The operations 900 may be performed by, for example, a first apparatus (e.g., an access point 110, a user terminal 120, or a wireless device 302, or a processing system therein).

The operations 900 may begin, at block 902, with the first apparatus generating a frame that solicits a response within a determined period (e.g., a SIFS). The frame comprises a first portion having one or more symbols (e.g., OFDM symbols) and a second portion positioned after the first portion in the frame and having a plurality of symbols. For certain aspects, the second portion may be the last portion of the frame (e.g., the last one or more OFDM symbols). At block 903, the first apparatus sets a data rate for the one or more symbols in the first portion to be greater (e.g., at least four times (4×) greater) than a data rate for the plurality of symbols in the second portion. At block 904, the first apparatus outputs the frame for transmission to a second apparatus (e.g., an access point 110, a user terminal 120, or a wireless device 302, or a processing system therein).

According to certain aspects, generating the frame at block 902 involves generating a 4× frame in accordance with the IEEE 802.11ax amendment or a subsequent amendment to the IEEE 802.11 standard. In this case, the one or more symbols in the first portion may be 4× (OFDM) symbols. For certain aspects, the plurality of symbols in the second portion may be 1× (OFDM) symbols having a transmission mode in accordance with the IEEE 802.11ac amendment or an earlier amendment to the IEEE 802.11 standard.

According to certain aspects, generating the frame at block 902 involves indicating, in a header of the frame, at least one of a presence or number of the OFDM symbols in the second portion (e.g., the last portion).

According to certain aspects, the second portion includes at least a portion of information necessary for the second apparatus to generate the response.

Figure 10:
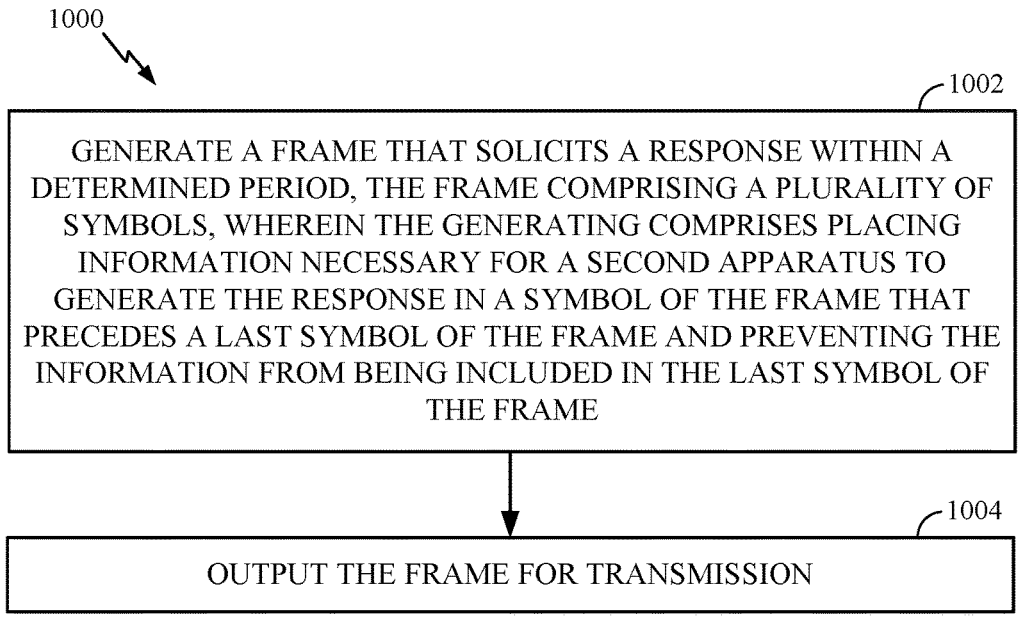
FIG. 10 is a flow diagram of example operations for outputting for transmission a frame that solicits a response and limits the information in the last symbol, in accordance with certain aspects of the present disclosure.

FIG. 10 is a flow diagram of example operations 1000 for outputting for transmission a frame that solicits a response and limits the information in the last symbol, in accordance with certain aspects of the present disclosure. The operations 1000 may be performed by, for example, a first apparatus (e.g., an access point 110, a user terminal 120, or a wireless device 302, or a processing system therein).

The operations 1000 may begin, at block 1002, with the first apparatus generating a frame that solicits a response within a determined period (e.g., a SIFS). The frame comprises a plurality of (OFDM) symbols. The first apparatus may generate the frame at block 1002 by placing information necessary for a second apparatus (e.g., a user terminal 120 or an access point 110) to generate the response in a symbol of the frame that precedes a last symbol (in time) of the frame and by preventing the information necessary for the second apparatus to generate the response from being included in the last symbol of the frame. For certain aspects, generating the frame at block 1002 involves generating a 4× frame in accordance with the IEEE 802.11ax amendment or a subsequent amendment to the IEEE 802.11 standard. At block 1004, the first apparatus outputs the frame for transmission to the second apparatus.

Figure 8A:
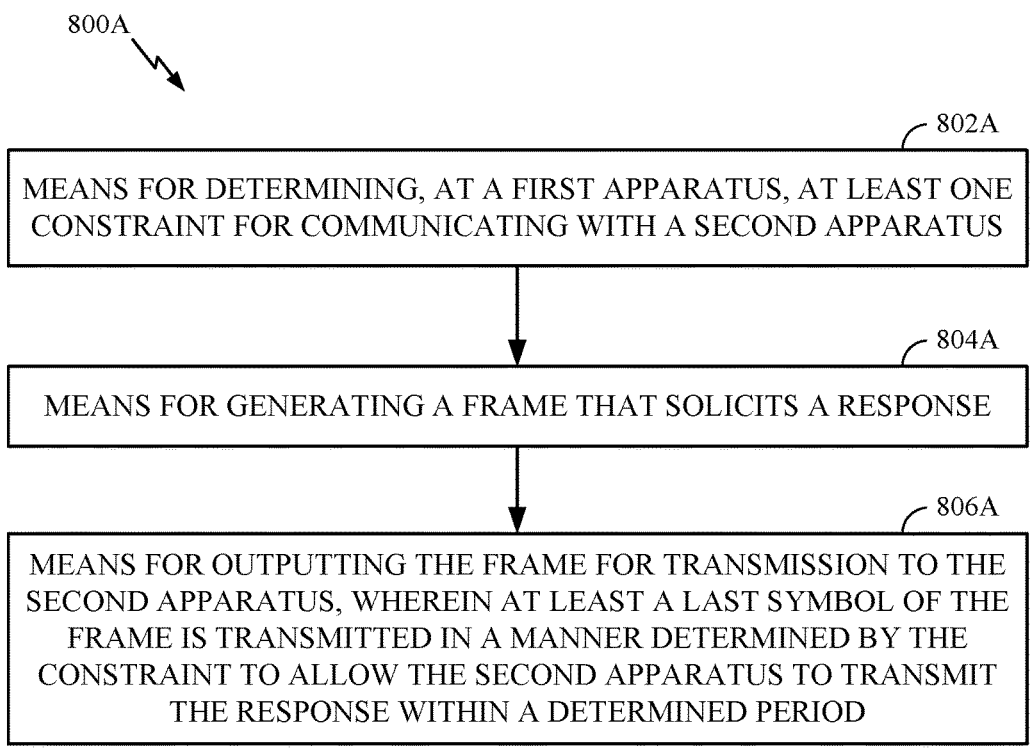
FIG. 8A illustrates example means capable of performing the operations shown in FIG. 8.
Figure 9A:
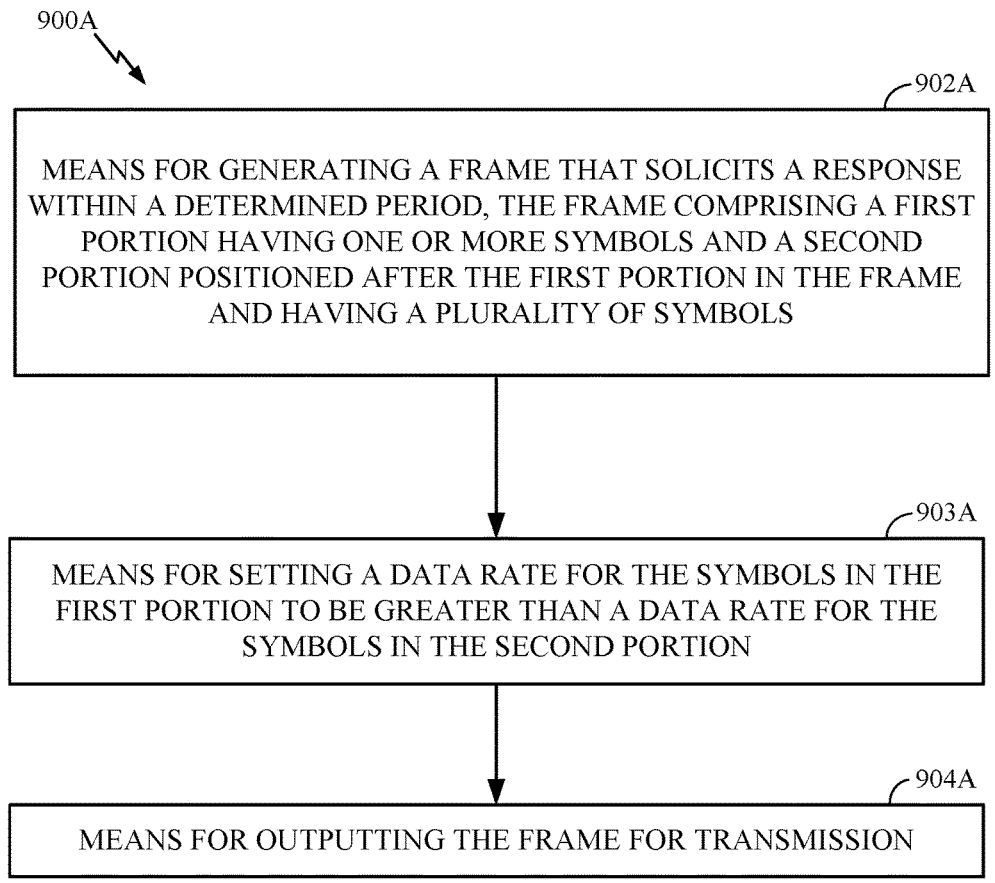
FIG. 9A illustrates example means capable of performing the operations shown in FIG. 9.
Figure 10A:
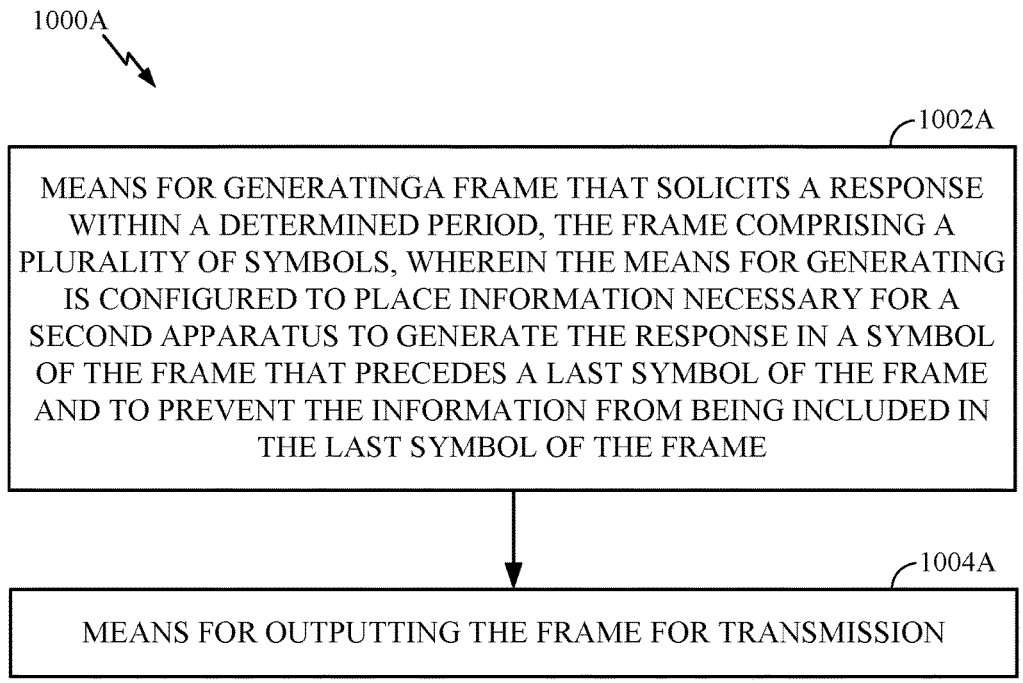
FIG. 10A illustrates example means capable of performing the operations shown in FIG. 10.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 800 illustrated in FIG. 8 correspond to means 800A illustrated in FIG. 8A, operations 900 illustrated in FIG. 9 correspond to means 900A illustrated in FIG. 9A, and operations 1000 illustrated in FIG. 10 correspond to means 1000A illustrated in FIG. 10A.

For example, means for transmitting may comprise a transmitter (e.g., the transmitter unit 222) and/or the antenna(s) 224 of the access point 110 illustrated in FIG. 2, a transmitter (e.g., the transmitter unit 254) and/or the antenna(s) 252 of the user terminal 120 portrayed in FIG. 2, or the transmitter 310 and/or antenna(s) 316 depicted in FIG. 3. Means for receiving may comprise a receiver (e.g., the receiver unit 222) and/or the antenna(s) 224 of the access point 110 illustrated in FIG. 2, a receiver (e.g., the receiver unit 254) and/or the antenna(s) 252 of the user terminal 120 shown in FIG. 2, or the receiver 312 and/or antenna(s) 316 depicted in FIG. 3. Means for processing, means for generating, means for outputting, and/or means for determining may comprise a processing system, which may include one or more processors (e.g., capable of implementing the algorithm or operations 800, 900, and 1000), such as the RX data processor 242, the TX data processor 210, and/or the controller 230 of the access point 110 illustrated in FIG. 2, the RX data processor 270, the TX data processor 288, and/or the controller 280 of the user terminal 120 illustrated in FIG. 2 or the processor 304 and/or the DSP 320 portrayed in FIG. 3.

In some cases, rather than actually transmitting a packet (or frame), a device may have an interface to output a packet for transmission. For example, a processor may output a packet, via a bus interface, to an RF front end for transmission. Similarly, rather than actually receiving a packet (or frame), a device may have an interface to obtain a packet received from another device. For example, a processor may obtain (or receive) a packet, via a bus interface, from an RF front end for reception.

According to certain aspects, such means may be implemented by processing systems configured to perform the corresponding functions by implementing various algorithms (e.g., in hardware or by executing software instructions). These algorithms may include, for example, an algorithm for determining at least one constraint for communicating with a second apparatus; an algorithm for generating a frame that solicits a response; and an algorithm for outputting the frame for transmission to the second apparatus, wherein at least a last symbol of the frame is transmitted in a manner determined by the constraint to allow the second apparatus to transmit the response within a determined period.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first apparatus, comprising:
   determining at least one constraint for communicating with a second apparatus;
   generating a frame that solicits a response;
   outputting the frame for transmission to the second apparatus, wherein at least a last symbol of the frame is transmitted in a manner determined by the at least one constraint to allow the second apparatus to transmit the response within a determined period, wherein the at least one constraint comprises a rate limit, and wherein generating the frame comprises:
   using padding in the at least the last symbol when the frame is to be transmitted at a rate greater than the rate limit; and
   indicating, in a header of the frame, a duration of the padding in the at least the last symbol;
   wherein the at least the last symbol of the frame is to be transmitted at a rate less than or equal to the rate limit; and
   wherein a modulation and coding scheme (MCS) of the at least the last symbol is set equal to:
   an MCS of a data portion of the frame, when the MCS of the data portion corresponds to a data rate that is less than the rate limit; or
   an MCS corresponding to the rate limit, when the MCS of the data portion corresponds to a data rate that is greater than or equal to the rate limit.

2. The method of claim 1, wherein the determined period comprises a short interframe space (SIFS).

3. The method of claim 1, wherein determining the at least one constraint comprises receiving an indication of the at least one constraint from the second apparatus.

4. The method of claim 1, wherein the rate limit is expressed as:
   a physical layer (PHY) rate; or
   a modulation and coding scheme (MCS), a bandwidth, a coding rate, a number of spatial streams, or a combination thereof.

5. A method for wireless communications by a first apparatus, comprising:
   determining at least one constraint for communicating with a second apparatus;
   generating a frame that solicits a response;
   outputting the frame for transmission to the second apparatus, wherein at least a last symbol of the frame is transmitted in a manner determined by the at least one constraint to allow the second apparatus to transmit the response within a determined period, wherein the at least one constraint comprises a rate limit, and wherein generating the frame comprises:

using padding in the at least the last symbol when the frame is to be transmitted at a rate greater than the rate limit; and indicating, in a header of the frame, a duration of the padding in the at least the last symbol;

wherein the rate limit is based on a number of bytes that allows the last symbol to be demodulated and processed by the second apparatus within the determined period; and wherein the at least the last symbol of the frame is transmitted at a rate greater than the rate limit and wherein:

a number of bytes necessary for the second apparatus to generate the response in the last symbol is less than or equal to the number of bytes that allows the last symbol to be demodulated and processed by the second apparatus within the determined period; or information necessary for the second apparatus to generate the response is limited to an early portion of the last symbol having a number of bytes less than or equal to the number of bytes that allows the last symbol to be demodulated and processed by the second apparatus within the determined period.

6. A first apparatus for wireless communications, comprising:

a memory; and a processing system coupled with the memory and configured to:

determine at least one constraint for communicating with a second apparatus;

generate a frame that solicits a response;

output the frame for transmission to the second apparatus, wherein at least a last symbol of the frame is transmitted in a manner determined by the at least one constraint to allow the second apparatus to transmit the response within a determined period, wherein the at least one constraint comprises a rate limit, and wherein the processing system is configured to generate the frame by being configured to:

use padding in the at least the last symbol when the frame is to be transmitted at a rate greater than the rate limit; and indicate, in a header of the frame, a duration of the padding in the at least the last symbol; and wherein the at least the last symbol of the frame is to be transmitted at a rate less than or equal to the rate limit and wherein a modulation and coding scheme (MCS) of the at least the last symbol is set equal to:

an MCS of a data portion of the frame, when the MCS of the data portion corresponds to a data rate that is less than the rate limit; or an MCS corresponding to the rate limit, when the MCS of the data portion corresponds to a data rate that is greater than or equal to the rate limit.

7. The first apparatus of claim 6, wherein the processing system is configured to determine the at least one constraint by being configured to receive an indication of the at least one constraint from the second apparatus.

8. The first apparatus of claim 6, wherein the rate limit is expressed as:

a physical layer (PHY) rate; or a modulation and coding scheme (MCS), a bandwidth, a coding rate, a number of spatial streams, or a combination thereof.

9. A first apparatus for wireless communications, comprising:

a memory;

a processing system coupled with the memory and configured to:

determine at least one constraint for communicating with a second apparatus;

generate a frame that solicits a response;

output the frame for transmission to the second apparatus, wherein at least a last symbol of the frame is transmitted in a manner determined by the at least one constraint to allow the second apparatus to transmit the response within a determined period, wherein the at least one constraint comprises a rate limit, and wherein the processing system is configured to generate the frame by being configured to:

use padding in the at least the last symbol when the frame is to be transmitted at a rate greater than the rate limit; and indicate, in a header of the frame, a duration of the padding in the at least the last symbol; and wherein the rate limit is based on a number of bytes that allows the last symbol to be demodulated and processed by the second apparatus within the determined period, wherein the at least the last symbol of the frame is transmitted at a rate greater than the rate limit, and wherein:

a number of bytes necessary for the second apparatus to generate the response in the last symbol is less than or equal to the number of bytes that allows the last symbol to be demodulated and processed by the second apparatus within the determined period; or information necessary for the second apparatus to generate the response is limited to an early portion of the last symbol having a number of bytes less than or equal to the number of bytes that allows the last symbol to be demodulated and processed by the second apparatus within the determined period.

10. A method for wireless communications by a first apparatus, comprising:

means for determining at least one constraint for communicating with a second apparatus;

means for generating a frame that solicits a response;

means for outputting the frame for transmission to the second apparatus, wherein at least a last symbol of the frame is transmitted in a manner determined by the at least one constraint to allow the second apparatus to transmit the response within a determined period, wherein the at least one constraint comprises a rate limit, and wherein generating the frame comprises:

using padding in the at least the last symbol when the frame is to be transmitted at a rate greater than the rate limit; and indicating, in a header of the frame, a duration of the padding in the at least the last symbol;

wherein the at least the last symbol of the frame is to be transmitted at a rate less than or equal to the rate limit; and wherein a modulation and coding scheme (MCS) of the at least the last symbol is set equal to:

an MCS of a data portion of the frame, when the MCS of the data portion corresponds to a data rate that is less than the rate limit; or an MCS corresponding to the rate limit, when the MCS of the data portion corresponds to a data rate that is greater than or equal to the rate limit.

11. A method for wireless communications by a first apparatus, comprising:

means for determining at least one constraint for communicating with a second apparatus;

means for generating a frame that solicits a response;
means for outputting the frame for transmission to the second apparatus, wherein at least a last symbol of the frame is transmitted in a manner determined by the at least one constraint to allow the second apparatus to transmit the response within a determined period, wherein the at least one constraint comprises a rate limit, and wherein generating the frame comprises:
　using padding in the at least the last symbol when the frame is to be transmitted at a rate greater than the rate limit; and
　indicating, in a header of the frame, a duration of the padding in the at least the last symbol;
wherein the rate limit is based on a number of bytes that allows the last symbol to be demodulated and processed by the second apparatus within the determined period; and
wherein the at least the last symbol of the frame is transmitted at a rate greater than the rate limit and wherein:
a number of bytes necessary for the second apparatus to generate the response in the last symbol is less than or equal to the number of bytes that allows the last symbol to be demodulated and processed by the second apparatus within the determined period; or
information necessary for the second apparatus to generate the response is limited to an early portion of the last symbol having a number of bytes less than or equal to the number of bytes that allows the last symbol to be demodulated and processed by the second apparatus within the determined period.

\* \* \* \* \*